April 14, 1942. F. D. JOESTING Re. 22,068

FUEL BURNER CONTROL SYSTEM

Original Filed June 27, 1936 2 Sheets-Sheet 1

INVENTOR
Frederick D. Joesting
BY HIS ATTORNEY
George H. Fisher

April 14, 1942. F. D. JOESTING Re. 22,068
FUEL BURNER CONTROL SYSTEM
Original Filed June 27, 1936 2 Sheets-Sheet 2
Fig. 3
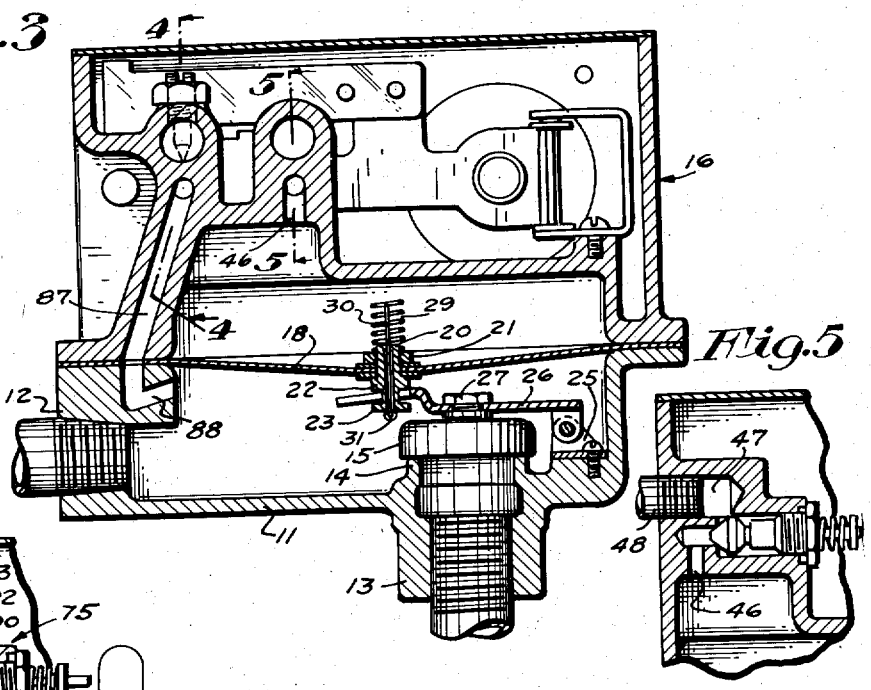
Fig. 5
Fig. 4
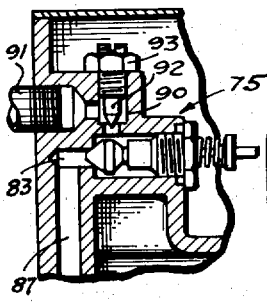
Fig. 6
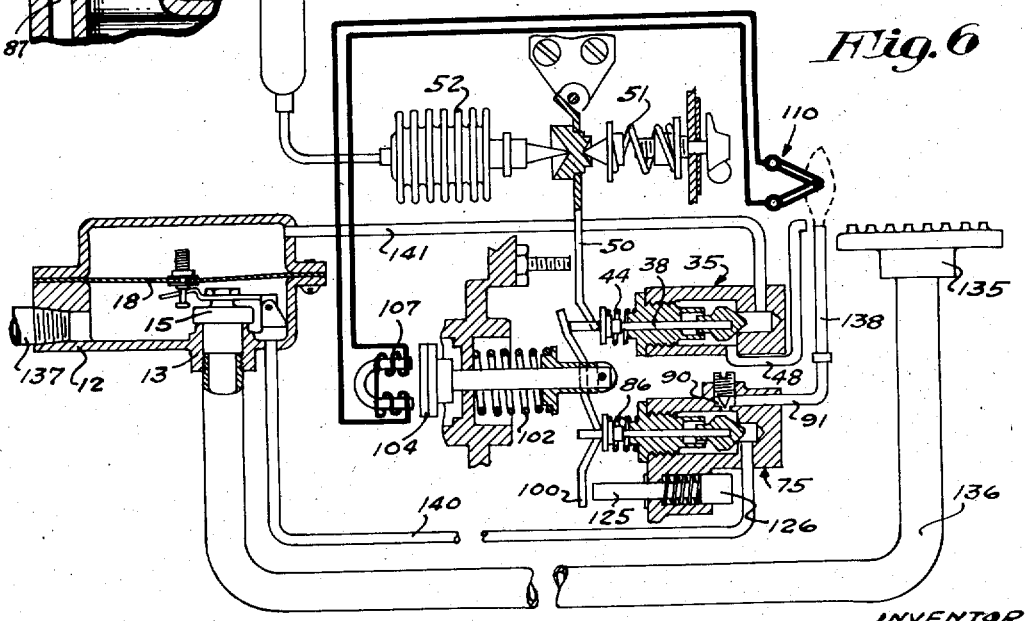
INVENTOR
Frederick D. Joesting
BY HIS ATTORNEY
George H Fisher Reissued Apr. 14, 1942

Re. 22,068

UNITED STATES PATENT OFFICE 22,068

FUEL BURNER CONTROL SYSTEM

Frederick D. Joesting, Chicago, Ill., assignor to Minneapolis-Honeywell Regulator Company, Minneapolis, Minn., a corporation of Delaware Original No. 2,118,886, dated May 31, 1938, Serial No. 87,716, June 27, 1936. Application for reissue May 29, 1940, Serial No. 337,930

27 Claims. (Cl. 236—1)

My invention relates to a fuel burner control system and more particularly to one employing means for interrupting the supply of fuel to the main burner in the event of the pilot burner being extinguished.

It is customary with certain types of fuel burner control systems to employ a constantly burning pilot for ignitng the fuel supplied to the main burner. Where such a pilot is employed, some means is usually provided for preventing fuel from being supplied to the main burner in the event that the pilot burner is extinguished. Such a means is commonly referred to as a safety pilot. The safety pilot arrangement may take any of various forms. It may operate directly through a valve in the main fuel line or it may operate through a control device such as a valve or switch, which in turn controls the operation of a main fuel valve which is normally controlled by some controlling condition. In certain of these systems, it is also common to provide a valve which controls the flow of gas to the pilot burner and is under the control of the safety pilot arrangement so that in the event of the pilot burner being extinguished, the supply of fuel to both the pilot burner and the main burner is interrupted. The present invention, while not so limited is particularly applicable to the latter type of system.

An object of the present invention is to provide a novel fuel burner control system employing a pressure motor operated main valve which is controlled by a control valve, and a pilot valve, wherein means are provided for closing both the pilot and main valves in the event of the pilot burner being extinguished and wherein means are provided for first opening the pilot valve while positively holding the control valve in a position causing the main valve to be closed and, then upon the pilot burner being lighted, moving the control valve to a position causing opening of the main valve.

A further object of the present invention is to provide a novel arrangement for the operation of two valves which are to be operated successively, the second being opened only after a predetermined condition has been established as the result of the operation of the first valve.

A further object of the present invention is to provide a novel safety pilot arrangement employing a thermocouple which is located in the path of the pilot flame and controls the opening and closing of a control valve of a pressure motor operated fuel valve in accordance with whether the pilot is ignited or not.

Other objects of the invention will be apparent from the accompanying specification, claims, and drawings, of which:

Figure 3 is a sectional view of the valve apparatus shown in Figures 1 and 2, which section is taken along the line 3—3 of Figure 2;

Figure 4 is a detailed sectional view with a section taken along the line 4—4 of Figure 3;

Figure 5 is a detailed sectional view of another portion of my valve apparatus, the section being taken along the line 5—5 of Figure 3; and in which Figure 6 is a schematic view of a novel fuel burner control system employing the valve apparatus of the present invention.

Figure 1:
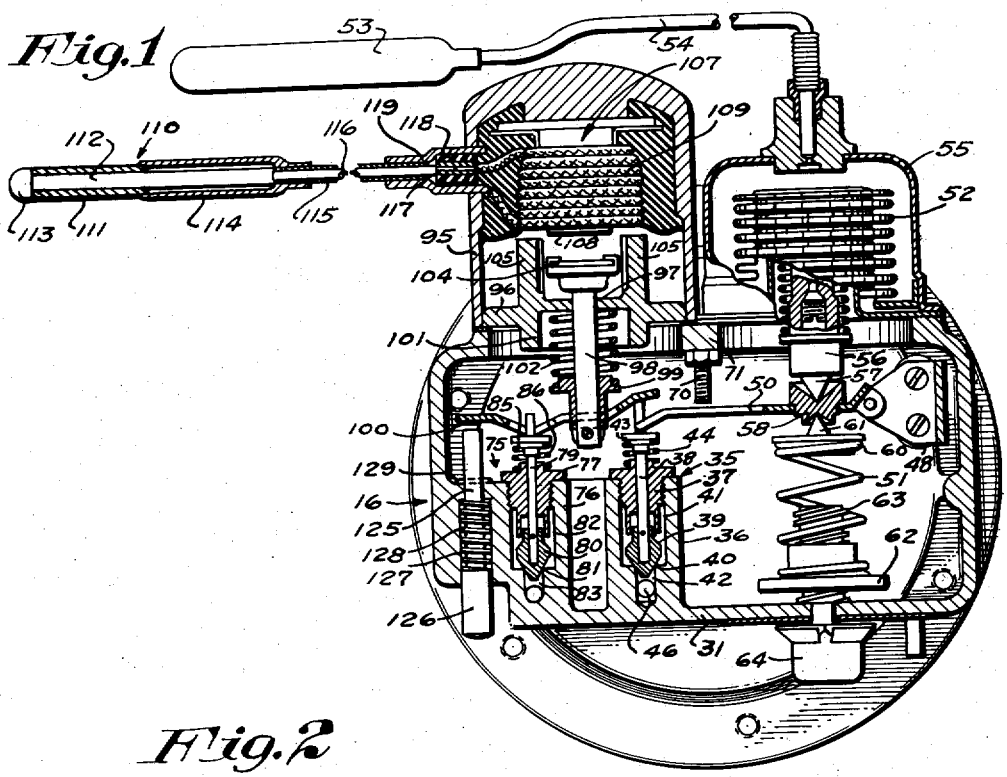
Figure 1 is a sectional view of a portion of a novel valve apparatus of the present invention, the section being taken along the line 1—1 of Figure 2.

Referring to the drawings, Figures 1 to 5 generally show the details of a novel valve mechanism which is particularly adapted for use in a gas burner control system. The valve in general comprises a diaphragm valve, the operation of which is controlled by a control valve. The valve mechanism further comprises a pilot burner valve which controls the supply of fuel to the pilot burner. When the pilot burner is ignited, the position of the control valve and consequently of the main valve is controlled in accordance with a bulb located in the space heated by the main burner. In the event of the pilot burner being extinguished, both the main and the pilot burner valves are closed through a thermo-couple arrangement.

Referring first to Figure 3 of the drawings, it will be noted that there is shown a diaphragm valve having a housing, the lower section of which is designated by the reference numeral 11. This housing is provided with an inlet connection 12 and an outlet connection 13. Adjacent the outlet connection 13 there is provided a raised annular portion 14 which serves as a valve seat to control the flow of fuel between the inlet and outlet. A valve disk 15 of any suitable construction is adapted to seat on valve seat 14.

The upper section of the valve housing is generally designated by the reference numeral 16. Clamped between the upper and lower sections 11 and 16 is a diaphragm 18 which diaphragm serves as the movable wall of a pressure motor actuating the valve disk 15. The diaphragm 18 is provided with an aperture through its central portion and a sleeve 20 extends through this aperture, being secured to the diaphragm 18 by a nut 21. The lower portion of sleeve 20 is provided with a pair of spaced shoulders 22 and 23. Secured to the interior of the lower section 11 of the valve housing is a bracket member 25 to which is pivotally secured a lever member 26. Secured to lever member 26 through suitable fastening means 27 is a valve disk 15. The outer end of the lever member 26 is slotted and two spaced arms of the slotted portion extend between the shoulders 22 and 23 of sleeve member 20. It will be readily seen that the lever member 26 serves as a means for transmitting movement of diaphragm 18 to the valve disk 15 so that upon upward movement of diaphragm 18, the valve disk 15 is raised from its seat.

Due to the fact that sleeve 20 has a passage extending therethrough, a restricted communication between the two sides of the diaphragm 18 is provided. As may be apparent from a subsequent description of the operation of the device, it is imperative that this restriced passage be open at all times. Accordingly, there is provided a spring member 29 which has an elongated stem portion 30 extending through the passage in sleeve 20 and terminating in an eyelet 31 which prevents the stem portion of spring 29 from being pulled out of sleeve 20. As will be more or less obvious, the upper movement of diaphragm 18 will cause the upper portion of the spring 29 to abut the upper portion of the valve casing causing stem 30 of spring 29 to move downwardly through the aperture in sleeve 20. The result is that each time that the diaphragm 18 is actuated, the stem portion 30 of spring 29 is reciprocated in the opening of sleeve 20 thus acting to clean the passage of any deposits that may collect therein.

In order to better understand the function of the apparatus to be subsequently described, it may be noted that the pressure motor comprising diaphragm 18 is of the type wherein one side of the diaphragm is constantly subjected to the full force of the motor fluid which may be the gas controlled by the valve. A bleed opening is provided through the diaphragm and the other side is subjected only to the pressure of the fluid which passes through the bleed opening. A bleed pipe is connected to the side of the diaphragm to which the gas bleeds and is provided with a control valve which when open permits the gas to bleed away from the chamber faster than it can bleed into the chamber by reason of the opening in the diaphragm. When the control valve is closed, the gas bleeding between the two sides of the diaphragm is allowed to accumulate in the chamber to which it bleeds with the result that the diaphragm is moved in the opposite direction. It is usual to arrange the pressure motor with respect to the valve actuated thereby so that the control valve in the bleed line is open when it is desired to open the valve and closed when it is desired to close the main valve.

Referring now to Figure 1, the control valve for the bleed gas leaving the upper side of the chamber 18 is generally designated by the reference numeral 35. This valve is located in a boss 36 projecting interiorly from a wall 31 of the upper portion 16 of the valve housing. A screw threaded gland 37 is secured in this boss and serves as a guide for a valve stem 38 to which is secured a valve head 39, cooperating with a valve seat 40 formed by the juncture of a larger recessed portion 41 with a smaller recessed portion 42 of the boss 36. The valve stem 38 is provided with a collar 43 and interposed between collar 43 and the gland nut 37 is a spring 44. As shown more clearly in Figure 5, the valve chamber communicates with the upper side of the diaphragm 18 through a passage 46. Also communicating with the valve chamber on the other side of the valve seat is a passage 47 which is threaded at its outer end to receive a pipe 48 leading to some suitable point of disposal of the bleed gas.

The means for normally controlling the position of the control valve 35 includes a lever 50 bearing against the valve stem collar 43, the position of which lever is determined by the opposing actions of a spring 51 and a bellows 52, which latter member is in turn controlled by the vapor pressure within a bulb 53. The lever is pivotally mounted on a U-shaped bracket 48 secured to the bottom wall of the control housing. The bulb 53 is located in the space heated by the burner controlled by the valve. The burner may desirably be a burner of the space heater type wherein the burner is located in the room to be heated, as distinguished from a furnace which is located in a basement remote from the rooms which are actually being heated. The bulb 53 is filled with some volatile fluid which is partly in a vaporous state at or about the temperature which it is desired to maintain in the room being heated and which is connected through flexible tubing 54 with the interior of a chamber 55 surrounding the bellows 52. Bellows 52 has connected thereto a stem member 56 which has a conical pin 57 which is adapted to bear against a member 58 secured to lever 50 which is provided with a conical recess in each side thereof.

The spring 51 is interposed between a disk 60 provided with a conical point 61 seated in one of the conical recesses of member 58 and a collar member 62, the position of which is determined by a screw member 63. Screw member 63 is threadedly connected with collar 62 and has rigidly secured at the outer end thereof a handle member 64 which facilitates rotation of screw 63 and a consequent movement of disk 62 inwardly or outwardly changing the tension on spring 51. Since the position of lever member 50 is determined by the opposing action of the bellows 52 and the spring 51, it will readily be seen that the temperature at which lever arm 50 is actuated from one position to another can be changed by varying the tension of spring 51. This serves as a means for regulating the temperature at which the control valve is moved from one position to another position and consequently the temperature at which the burner is brought into operation. The handle 64 is provided with a pointer 65 which pointer cooperates with a dial 66 which bears suitable indicia thereon to indicate the setting of the thermostatic apparatus previously described.

Figure 2:
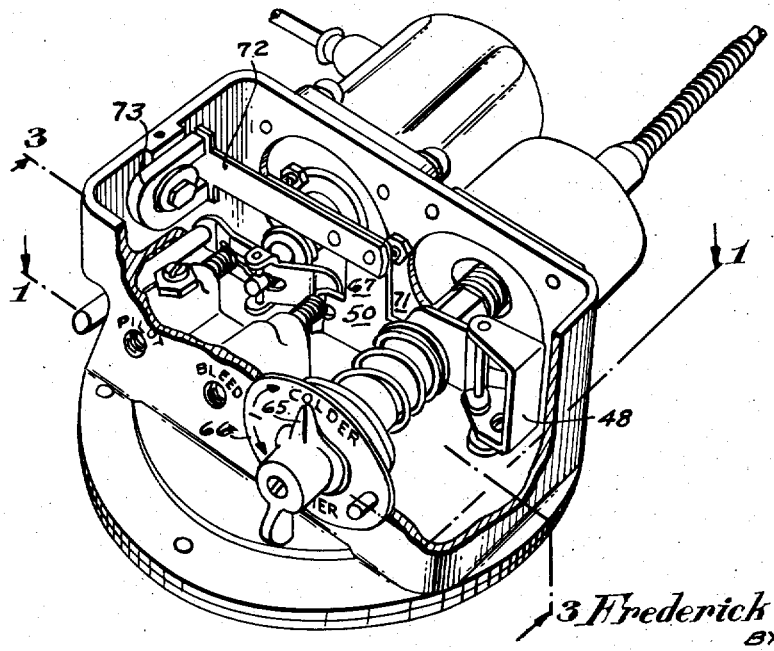
Figure 2 is a perspective view with a portion broken away of the valve apparatus of the present invention.

As indicated in Figure 2, the lever member 50 is provided with an arm 67 to which is secured an extension 72 of magnetic material which member cooperates with a permanent magnet 73. The effect of this magnet is to tend to retain lever 50 in a position shown in Figure 1 so that it is necessary for there to exist an appreciable differential between the pressures exerted by spring 51 and by bellows 52 before lever 50 is moved to a position permitting valve 35 to open. After the temperature has dropped to the point where the member 50 is moved to a position wherein valve 35 is open and the temperature to which bulb 53 is subjected begins to rise causing the pressure exerted through bellows 52 to exceed the pressure exerted by spring 51, the effect of the magnet 73 is negligible so that the lever 50 does not begin to close valve 35 until an appreciable rise in temperature has taken place. In this manner, a differential is secured between the temperature at which the valve opens and at which it closes. If it were not for the arrangement comprising the magnet 73, the valve 35 would be constantly opening and closing and occupying various intermediate positions between open and closed positions. In an apparatus of this type, this would be highly undesirable.

A stop member 70 is secured to a side wall 71 of the casing 16. This stop member serves to limit the outward movement of the lever 50. The inward movement of the lever is limited by reason of valve 38 engaging with valve seat 40.

The numeral 75 is used to generally indicate a valve which is adapted to control the flow of gas to a pilot burner. This valve is located in a boss 76 projecting from the wall 31. A gland nut 77 is threaded into the boss 76 and acts as a guide for a valve stem 78 to which is secured a valve head 80. The valve head 80 is adapted to cooperate with valve seat 81 formed by the juncture of a recessed portion 82 of comparatively large diameter with a recessed portion 83 of relatively small diameter. The valve stem 78 has secured thereto adjacent its outer end a collar 85. Interposed between collar 85 and the gland 77 is a spring 86 which serves to bias the valve head 80 away from the valve seat 81. Referring to Figures 3 and 4, it will be noted that the passage formed by the recessed portion 83 communicates with a passage 87 which in turn communicates with a similar passage 88 in the lower section 11 of the valve housing. The passage 88 connects with the space on the underside of the diaphragm, which space is in constant communication with the inlet 12. Connecting with the passage formed by recessed portion 82 is a passage 90 which is provided with screw threads at its outer end to facilitate the connection thereto of a pipe 91 which may lead to a pilot burner. Interposed in the passage 90 is a needle valve 92 which may be adjusted to regulate the flow of gas to the pilot burner. A lock nut 93 cooperates with needle valve 92 to lock the same in any desired adjusted position. It will be seen that when the valve 75 is open, gas may flow from the inlet side of the valve housing through passages 88, 87, 83 and 90 to pipe 91 which, as previously indicated, preferably leads to a pilot burner of suitable construction.

As indicated in a previous portion of the specification, the valve mechanism of the present invention is provided with an arrangement wherein upon the pilot burner being extinguished, both the control valve 35 and the pilot burner valve 75 will move to closed position. The mechanism for so moving these valves will now be described. Secured to the side wall 71 of the valve casing is a housing member 95 which is provided with a cover 96 apertured at 97. Extending through this aperture 97 is a rod 98, which rod has secured at its end adjacent the valves 35 and 75, a collar 99. An elongated strip-like member 100 is pivotally secured to the collar member 99 and is so disposed relative to the valve structures 35 and 75, previously described, that upon rod member 98 being moved in the direction of the valves, the member 100 is caused to bear upon the end of stem 38 of valve 35 and upon the collar 85 of valve 75. The cover 96 is recessed at 101 and located in this recess is a spring 102 which bears at one end against the cover 96 and at the other end against the collar 99. This spring has a strength greater than the combined strength of springs 44 and 86 so that so long as the position of rod 98 is determined solely by spring 102, this spring urges the rod 98 in the direction of the valves 35 and 75 with sufficient force that member 100 is caused to hold both valves in closed position.

Secured at the outer end of rod 98 is an armature member 104. This armature member is guided in its movement by flanges 105 projecting from the cover 96. The armature is adapted to cooperate with a magnet generally indicated by the reference numeral 107. This magnet is provided with a core 108 of very high permeability and the windings 109 of the magnet are of relatively large wire for a reason subsequently to be set forth. It will be readily seen that when the magnet 107 is energized and the armature 104 is held in engagement therewith that member 100 will be sufficiently retracted, that valve 75 will be moved to open position by the spring 86 and that valve 35 will move to the position permitted by lever 50.

A thermo-couple is employed to energize the magnet 107. This thermo-couple is generally designated by the reference numeral 110 and comprises the usual elements 111 and 112 of different thermo-electric characteristics which are joined at 113 to form the hot junction of the thermo-couple. The two elements 111 and 112 may be of any desired materials which have suitable thermo-electric characteristics to generate current sufficient for the energization of magnet 107. As one example of the materials which may be employed, it has been found particularly successful to employ an outer element 111 of stainless steel. The stainless steel may be of any form which is capable of resisting the heat of a pilot flame. In the example referred to, the inner element was made of "Constantan" which is an alloy consisting of approximately fifty per cent nickel and fifty per cent copper. The outer member 111 is secured through a copper reducing sleeve 114 to a copper tube 115. Secured to the inner member 112 is an insulated conductor 116. Conductor 116 is secured through a connecting sleeve 117 to one end of the winding 109 of magnet 107. A sleeve 118 of insulating material is disposed over the connecting sleeve 117 and surrounding the sleeve 117 is an outer coupling sleeve 119 which serves to secure the copper tube 115 to the housing 95 and which also serves to electrically connect the copper tube 115 with the other end of the winding 109 of magnet 107. The size of the copper tube 115 and the conductor 116 is comparatively large so as to offer an extremely low resistance to the conduction of current therethrough. This is imperative inasmuch as the voltage generated by the thermo-couple is relatively small, and in order to obtain a sufficient flow of current through the winding of magnet 107, it is necessary that all of the conductive members have a comparatively low resistance.

Slidably mounted in an enlarged portion of the wall 31 of valve casing 16 is a pin 125. This pin is provided with a button portion 126 which is slidably mounted in a recess 127 in the valve casing wall. Located in this recess 127 surrounding the pin 125 is a spring 128 which serves to bias the pin 125 outwardly. A small pin 129 extends transversely through pin 125 to form a stop to limit the outward movement of pin 125. It will be noted that the button 126 extends outwardly from the casing 16 so as to be readily engaged manually from the exterior of the casing. Upon pushing button 126 inwardly, the inner end of the pin 125 engages member 100. If this movement is continued, member 100 will be moved in the direction of wall 71 of the valve casing, being pivoted about the end of the valve stem 38 of valve 35. This movement will cause armature 104 to approach the core 108 of the magnet 107. This movement will also cause member 100 to move away from collar 85 permitting spring 86 to move valve 80 to open position. The result of push button 126 being moved entirely in, is, accordingly, that armature 104 is brought into engagement with the core of magnet 107 and that valve 75 is moved to open position. At the same time, valve 35 is held closed even more securely than before due to the fact that member 100 is pivoted about the end of valve stem 38.

Upon the push button 126 being actuated in the manner described in the previous paragraph, if the magnet is energized so that armature 104 is held in engagement therewith, the release of push button 126 will permit member 100 to be moved away from the end of valve stem 38. What happens is that upon armature 104 being so held, the member 100 is free to pivot about its pivotal connection with collar 99 so that the biasing springs 44 and 86 are effective to move member 100 to a position wherein both valves 35 and 75 may be in open position. In the new position, member 100 will have substantially the same angular position as shown in Figure 1 but the position will be shifted transversely in the direction of wall 71 of the valve casing to an extent sufficient to permit the opening of valves 35 and 75.

This operation will be more clearly understood in connection with a subsequent description of the operation of the valve in a fuel control system.

In Figure 6 of the drawings, there is shown, in schematic form, the valve mechanism of the present invention incorporated in a novel fuel control system. Although the valve mechanism is shown in schematic form, the same reference characters have been employed in connection with this portion of Figure 6 as were used in the description of the valve mechanism in connection with the previous figures. It is believed that from the previous description, the relation of the various elements of the valve mechanism in Figure 6 will be readily apparent so that substantially no further description of the same will be set forth in connection with this valve.

Referring to Figure 6, a gas burner is designated by the reference numeral 135. This gas burner is supplied with gas through a pipe 136 connected to the outlet 13 of the main gas valve previously described. Connected to the inlet 12 of the gas valve is a pipe 137 which leads to a gas main.

A pilot burner is designated by the reference numeral 138. This burner is connected through pipe 91 to the passage 90 which is controlled by valve 75 as described in connection with Figure 4. For the purposes of illustration, a pipe 140 is shown as connecting the underside of the valve casing with valve 75 in lieu of passages 88, 87 and 83.

In order to simplify the showing of the valve mechanism in this figure, a pipe 141 is shown as connecting the upper portion of the valve casing with valves 35, instead of passages 42 and 46. The pipe 48 referred to in connection with Figure 5 is shown as extending to a point adjacent the pilot burner 138 so that the gas escaping therethrough will be consumed in the pilot burner flame.

*Operation*

The various elements are shown in Figure 6 in the position which they assume when the burner is out of operation and when the pilot burner 138 is extinguished. If it is desired to start the operation of the system, it is first necessary to light the pilot burner 138. In order to do this, button 126 is pushed inwardly in the manner previously described. This pushing inwardly of button 126 causes member 100 to be pivoted about the end of the valve stem 38 of valve 35 causing the armature 104 to move into engagement with the magnet 107 and at the same time to permit biasing spring 86 to move the valve 75 to open position. The result is that gas is admitted through pipe 137 underneath the diaphragm, through pipe 140, valve 75 and pipe 91 to the pilot burner 138, the gas escaping from this pilot burner 138 being ignited by any suitable means.

As the button 126 is held inwardly, holding armature 104 in engagement with magnet 107, the energization of magnet 107 by reason of the thermo-couple 110 becoming heated by the pilot flame will soon be sufficient to hold armature 104 in engagement with magnet 107. When this condition occurs, the release of button 126 will release the end of member 100 adjacent the pin 125 and will permit the biasing spring 44 of valve 35 to move valve 35 to a position permitted by lever 50. Usually when the burner is being started up in this manner, it is because the temperature of the space heated by the burner has fallen to a point where there is a demand for heat. Under these conditions, the position of lever 50 will be such that upon member 100 being held by the magnet 107, spring 44 will be effective to move the valve 35 to open position. When this takes place, the gas above the diaphragm 18 is permitted to bleed off through pipe 141 through valve 35 and pipe 48. Since gas can bleed off in this manner faster than it can bleed through the diaphragm, the effect is to relieve the pressure above the diaphragm. As previously explained, the underside of the diaphragm is constantly subjected to the pressure of the supply gas so that as soon as the pressure above the diaphragm is released in this manner, diaphragm 18 moves upwardly causing valve 15 to move to open position and permitting gas to flow to burner 135.

The operation of the burner will normally continue until the temperature in the space heated thereby has risen to the point wherein the bellows 52 is able to overpower springs 51 and 44 and move valve 35 to closed position. Upon this taking place, the escape of gas from the upper side of the diaphragm is interrupted. The gas will continue to flow through the passage in the diaphragm, however, and in a very short period of time the pressure will be built up in the chamber above the diaphragm sufficiently to cause downward movement of diaphragm 18 and the closing of valve 15.

If during the operation of the valve as previously described, the pilot burner flame is for any reason extinguished, the hot junction of the thermo-couple 110 will no longer be heated with a result that magnet 107 is deenergized. The deenergization of this magnet will release the armature 104 permitting spring 102 to move member 100 to the position shown in Figure 1 wherein this member is effective to hold both valves 35 and 75 closed. The closing of valve 35 will interrupt the supply of fuel to the burner 135 and the closing of valve 75 will interrupt the supply of fuel to the pilot burner 138. In this manner, the danger of an explosion arising from gas being admitted to an unignited burner is eliminated. With the apparatus described, the extinguishment of the pilot burner flame not only causes closing of the main gas valve but also causes closing of the pilot burner valve.

In the previously described operation of the resetting mechanism comprising the pin 125, it was assumed that the pilot burner was properly ignited and that the thermo-couple 116 became heated sufficiently to energize magnet 107 and hold armature 104 in engagement therewith. If for some reason the pilot burner is not properly ignited, the release of push button 126 will cause the pilot burner valve 75 to be closed and the parts to again assume the position shown in Figure 1. It will be noted that the inward movement of pin 125 by actuation of push button 126 does not cause the opening of control valve 35 so that a reciprocation of this member does not admit gas to the main burner unless the pilot burner is ignited. By the arrangement described, it is impossible for someone to accidently admit gas to the main burner, which gas is unignited, by pushing button 126. The only time that actuation of push button 126 will open the valve 35 and consequently cause admission of gas to the main burner is when the pilot burner is ignited while push button 126 is held inwardly during such actuation. Moreover, not only is the control valve not open during reciprocation of the resetting member, but this valve is held even more firmly against the seat during such operation than normally.

While I have described my invention as applied to a fuel burner control system, certain features thereof are deemed to be applicable to the control of any two valves which are to be operated successively by some actuating means. Moreover, while I have described the operation of the main valve as being controlled by a control valve, it is to be understood that in lieu of the control valve, some other control device might be substituted without departing from the scope of the invention. It is to be understood that the specific embodiment of my invention shown and described is for purposes of illustration only and that my invention is to be limited only by the scope of the appended claims.

I claim as my invention:

1. In a fluid fuel burner control system, a main burner, a pilot burner, a main valve controlling the flow of fuel to said main burner, a pressure motor for operating said main valve, means for supplying a pressure fluid to said motor to operate the same, a control valve for controlling the pressure in said motor, said pressure motor being operative when said control valve assumes a first position to hold said main valve in closed position and when said control valve assumes a second position to move said main valve to open position, controlling means including a device responsive to a normally controlling condition for varying the position of said control valve, and means operative to move said control valve to said first position in the absence of a flame at said pilot, said last named means comprising a member adapted to cooperate with said control valve and biased to a position wherein the control valve is held in said first position, an electromagnet adapted to hold said member in a different position wherein said control valve is under the control of said controlling means, and means for controlling the energization of said electromagnet in accordance with the absence or presence of a flame at said pilot.

2. In a fluid fuel burner control system, a main burner, a pilot burner, a main valve controlling the flow of fuel to said main burner, a pressure motor for operating said main valve, means for supplying a pressure fluid to said motor to operate the same, a control valve for controlling the pressure in said motor, said pressure motor being operative when said control valve assumes a first position to hold said main valve in closed position and when said control valve assumes a second position to move said main valve to closed position, controlling means including a device responsive to a normally controlling condition for varying the position of said control valve, and means operative to move said control valve to said first position in the absence of a flame at said pilot, said last named means comprising a member adapted to cooperate with said control valve and biased to a position wherein the control valve is held in said first position, a magnet adapted to hold said member in a different position wherein said control valve is under the control of said controlling means, and means for controlling the energization of said magnet comprising a thermo-couple having its hot junction located in the path of the pilot burner flame.

3. In combination, a pair of valves each movable from a first to a second controlling position, one of said valves being adapted when moved to its second controlling position to make possible the establishment of a condition which should exist prior to the movement of said second valve to its second controlling position, means biasing each of said valves to its second controlling position, yieldable means for holding said valves in said first controlling position against the action of said biasing means, holding means including a device responsive to said condition for holding said yieldable means when said condition exists, in a retracted position wherein the position of the valves is not affected thereby, and reciprocable means operable upon actuation in one direction to move said yieldable means to a position wherein it may be held by said holding means upon the existence of said condition and wherein it is ineffective to hold said first valve closed but effective to hold said second valve closed, said yieldable means being operative upon actuation of said reciprocable means in the opposite direction and upon being held by said holding means to assume said retracted position wherein said second valve is also free to move from its first controlling position.

4. In combination, a pair of valves each movable from a first to a second controlling position, one of said valves being adapted when moved to its second controlling position to make possible the establishment of a condition which should exist prior to the movement of said second valve to its second controlling position, means biasing each of said valves to its second controlling position, a member adapted to engage said valves adjacent its respective ends, yieldable means acting on said member intermediate said valves in a direction and with a force such that said valves are held in said first controlling positions against the action of said biasing means, holding means including a device responsive to said condition for holding said member when said condition exists at a point intermediate said valves and in a position such that said member does not restrict the movement of said valves, and reciprocable means for engaging said member adjacent the end thereof opposite said second valve and tilting said member about said second valve to simultaneously move said first valve to its second controlling position and said member into a position wherein said holding means may engage the same if said condition exists, said biasing means being operative in the event of said holding means being effective and upon release of said reciprocable means to move said second valve to its second controlling position.

5. In combination, a plurality of valves each biased to open position, one of which when open makes possible the establishment of a condition which should exist before the second valve is opened, yieldable means including a pivoted member effective to hold said valves in closed condition against the action of said biasing means, holding means including a device responsive to said condition for holding said yieldable means in a position wherein said valves may move to open position, and a reciprocable member engaging said pivoted member and operable upon movement in one direction to push said yieldable means to a position wherein said first valve is open and said second valve closed and wherein said holding means is adapted to hold said yieldable means, said pivoted member being operative upon said yieldable means being so held and upon said reciprocable member being moved in the opposite direction to assume a position wherein said second valve may move to open position.

6. In a control system, a pair of valves each controlling a different condition, a biasing means associated with each of said valves for urging the valve to a first position wherein the respective condition controlled by it may be established, common biasing means acting on said valves in opposition to and with a greater force than said individual biasing means to move said valves to a second position, means for tilting said common biasing means to a position wherein said common biasing means is ineffective to oppose the individual biasing means of one of said valves so as to cause said valve to be moved to its first position, and means including a device responsive to the condition established by the movement of said one valve to its first position to hold said common biasing means in a position wherein upon release of said tilting means, said common biasing means is ineffective to oppose the individual biasing means of the other valve.

7. In combination, means for establishing a predetermined condition, means including a valve for establishing a second condition upon the first condition being established and upon said valve being moved from a first to a second controlling position, a first biasing means acting to bias said valve to said second controlling position, a second biasing means acting when in a first position in opposition to and with greater force than said first biasing means to hold said valve in said first controlling position, holding means including a device responsive to said first condition for holding said second biasing means upon the establishment of said first condition in a second position wherein the valve it not affected thereby, and actuating means for moving said second biasing means from said first to a third position wherein the same is still effective upon the valve but wherein it is adapted to cooperate with said holding means, said first biasing means being operative upon release of said actuating means and upon the holding means being effective as the result of the presence of the first condition to move said second biasing means to said second position and to move said valve to said second controlling position.

8. In combination, a pair of valves, biasing means for each valve urging the same to open position, a lever member engaging each of said valves, a second biasing means effective on said lever member at a point intermediate said valves and acting in opposition to and with sufficient force relative to the first mentioned biasing means to hold said valves closed, a reciprocable actuator adjacent one of said valves and adapted upon movement in one direction to pivotally move said lever member away from the valve adjacent said actuator and about said other valve, and means to pivotally hold said member adjacent the point at which said second biasing means acts when said member is so moved, the first mentioned biasing means of said other valve being operative upon movement of the actuator in the opposite direction to move said lever member when so pivotally held in a position wherein it does not prevent opening movement of either valve.

9. In combination, a pair of valves, biasing means for each valve urging the same to open position, a lever member engaging each of said valves, a second biasing means effective on said lever member at a point intermediate said valves and acting in opposition to and with sufficient force relative to the first mentioned biasing means to hold said valves closed, a reciprocable actuator adjacent one of said valves and adapted upon movement in one direction to pivotally move said lever member away from the valve adjacent said actuator and about said other valve, and holding means comprising a magnet and armature one of which is pivotally connected to said lever member adjacent the point at which said second biasing means acts and the other of which is rigidly mounted, the armature and magnet being so spaced that when said member is so moved said armature and magnet are moved relatively into holding engagement with each other, the first mentioned biasing means of said other valve being operative upon movement of the actuator in the opposite direction to move said lever member when so pivotally held in a position wherein it does not prevent opening movement of either valve.

10. In a fluid fuel burner control system, a main burner, a pilot burner, means for regulating the flow of fuel to said main burner including a control device movable between a first position in which the flow of fuel is prevented and a second position wherein said flow is permitted, a pilot valve for controlling the flow of fuel to the pilot burner, controlling means including a device responsive to a normally controlling condition for moving said control device between its two positions in accordance with the value of said condition, means responsive to the presence or absence of a flame adjacent said pilot burner and operative upon the pilot flame being extinguished to move said control device to its first position and said pilot valve to its closed position, and means including a reciprocable element for resetting said control device and said pilot valve when so moved, said resetting means being operable upon movement of said element in one direction to cause said pilot valve to open while holding said control device in its first position and upon movement of said element in the reverse direction to permit said control device if said pilot is ignited to assume a position wherein it is under the control of said controlling means.

11. In a fluid fuel burner control system, a main burner, a pilot burner, means for regulating the flow of fuel to said main burner including a control device movable between a first position in which the flow of fuel is prevented and a second position wherein said flow is permitted, controlling means including a device responsive to a normally controlling condition for moving said control device between its two positions in accordance with the value of said condition, means responsive to the presence or absence of a flame adjacent said pilot burner and operative upon the pilot flame being extinguished to move said control device to said first position independently of said controlling means, said means comprising a member biasing said control device to said first position, a magnet for holding said member in a position wherein said control device is under the control of said controlling means, and means for energizing said magnet in accordance with the absence or presence of a flame at said pilot.

12. In a fluid fuel burner control system, a main burner, a pilot burner, means for regulating the flow of fuel to said main burner including a control device movable between a first position in which the flow of fuel is prevented and a second position wherein said flow is permitted, controlling means including a device responsive to a normally controlling condition for moving said control device between its two positions in accordance with the value of said condition, means responsive to the presence or absence of a flame adjacent said pilot burner and operative upon the pilot flame being extinguished to move said control device to said first position independently of said controlling means, said means comprising a member biasing said control device to said first position, a magnet for holding said member in a position wherein said control device is under the control of said controlling means, and means for energizing said magnet comprising a thermocouple having its hot junction located in the path of the pilot burner flame.

13. In combination, a pair of valves, one of which is adapted to control a condition which should exist before the other valve is opened, and actuating means for said valves including a reciprocable member and a device responsive to said condition, said actuating means being effective upon said member being moved in one direction to cause said first valve to be moved to a position making possible the establishment of said condition while applying part of the force applied to said reciprocable member to said other valve to hold the same closed, and upon said member being moved in the opposite direction to cause said second valve to be opened in the event of said condition having been established.

14. In combination, a pair of valves, one of which is adapted to control a condition which should exist before the other valve is moved from a first to a second controlling position, and actuating means for said valves including a reciprocable member and a device responsive to said condition, said actuating means being effective upon said member being moved in one direction to cause said first valve to be moved to a position making possible a change in said condition while applying part of the force applied to said reciprocable member to said other valve to hold the same in said first position, and upon said member being moved in the opposite direction to cause said second valve to be moved to said second position in the event of said condition having been established.

15. In combination, a burner, a device adapted upon being moved to a first position to establish a condition which is desirable only when said burner is ignited, a lever adapted to bear against said device, yieldable means urging said lever into engagement with said device so as to hold said device in a second position, holding means comprising an armature unit and an electromagnet unit, one of said units being fixedly mounted and the other pivotally connected to said lever at substantially the same point at which said yieldable means acts on said lever, which point is spaced from that at which the lever engages said device, a thermo-couple having its hot junction located in said burner flame and connected to said electromagnet unit, said thermocouple being effective when said burner is ignited to energize said electromagnet unit sufficiently to hold said two units together against the action of said yieldable biasing means, and an actuating member adapted to engage said lever and effective upon being moved in one direction to rock said lever about said device and move said two units together whereby said device is free to move to said first position only after return movement of said actuating means and upon said electromagnet unit being energized.

16. In combination, a burner, a valve adapted upon being moved to a first position to establish a condition which is desirable only when said burner is ignited, a lever adapted to bear against said valve, yieldable means urging said lever into engagement with said valve so as to hold said valve in a second position, holding means comprising an armature unit and an electromagnet unit, one of said units being fixedly mounted and the other pivotally connected to said lever at substantially the same point at which said yieldable means acts on said lever, which point is spaced from that at which the lever engages said valve, a thermocouple having its hot junction located in said burner flame and connected to said electromagnet unit, said thermocouple being effective when said burner is ignited to energize said electromagnet unit sufficiently to hold said two units together against the action of said yieldable biasing means, and an actuating member adapted to engage said lever and effective upon being moved in one direction to rock said lever about said valve and move said two units together whereby said valve is free to move to said first position only after return movement of said actuating means and upon said electromagnet unit being energized.

17. In combination, a burner, a valve adapted upon being moved to open position to establish a condition which is desirable only when said burner is ignited, a lever adapted to bear against said valve, yieldable means urging said lever into engagement with said valve so as to hold said valve in closed position, holding means comprising an armature unit and an electromagnet unit, one of said units being fixedly mounted and the other pivotally connected to said lever at substantially the same point at which said yieldable means acts on said lever, which point is spaced from that at which the lever engages said valve, a thermocouple having its hot junction located in said burner flame and connected to said electromagnet unit, said thermocouple being effective when said burner is ignited to energize said electromagnet unit sufficiently to hold said two units together against the action of said yieldable biasing means, and an actuating member adapted to engage said lever and effective upon being moved in one direction to rock said lever about said valve and move said two units together whereby said valve is free to open only after return movement of said actuating means and upon said electromagnet unit being energized.

18. In combination, a control device movable between a safe position and an active position, an electromagnet, an armature movable into and out of engagement with said electromagnet, said electromagnet being capable of holding said armature but incapable of moving said armature into engagement therewith, means including a mechanical connection between said armature and said control device for directly moving said control device to its safe position upon release of the armature by the electromagnet, and resetting means for moving said armature into engagement with said electromagnet without movement of said control device from said safe position, said means further being effective upon said armature being held by said electromagnet and release of said resetting means to move said control element to said active position.

19. In combination, a control device movable between a safe position and an active position, an electromagnet, an armature movable into and out of engagement with said electromagnet, means biasing said armature out of engagement with said electromagnet, said electromagnet being capable of holding said armature but incapable of moving said armature into engagement therewith against the action of said biasing means, a mechanical connection between said armature and said control device by which said biasing means moves said control device to its safe position upon release of the armature by the electromagnet, and resetting means for moving said armature into engagement with said electromagnet against said biasing means without movement of said control device from said safe position, said mechanical connection being effective upon said armature being held by said electromagnet and release of said resetting means to move said control element to said active position.

20. In combination, a valve, an electromagnet, an armature movable into and out of engagement with said electromagnet, said electromagnet being capable of holding said armature but incapable of moving said armature into engagement therewith, a mechanical connection between said armature and said valve for directly moving said valve to closed position as said armature moves away from said electromagnet upon release by said electromagnet, and resetting means for moving said armature into engagement with said electromagnet without opening of said valve, said mechanical connection being effective upon said armature being held by said electromagnet and said resetting means being moved to its original position to open said valve.

21. In combination, a valve, means for moving said valve to a first position, a member adapted to move said valve to a second position, holding means for said member, said holding means comprising an armature unit and an electromagnet unit, one of said units being fixedly mounted and the other being pivotally connected to said member, said electromagnet unit being capable when energized of holding said units together but incapable of moving them together, and an actuating member effective when moved in one direction to apply a force to said member to cause it to rock about said valve and hold it in said second position while moving said electromagnet and armature units together whereby said valve is free to be moved to said first position by said first named means only after return movement of said actuating means and upon said electromagnet unit being energized.

22. In combination, a main fluid fuel burner, a pilot burner therefor, valve means controlling the flow of fuel to said main burner, a valve housing for said valve means having a main passage leading to said burner and an auxiliary passage leading to said pilot burner, an electromagnet, an armature movable into engagement with said electromagnet, means responsive to the presence of a pilot flame for energizing said electromagnet sufficiently to hold said armature in engagement therewith but insufficiently to move it into engagement therewith, means associated with said armature for moving said valve means to a fuel flow preventing position when said armature is released from said electromagnet, resetting means for moving said armature into reengagement with said electromagnet, and means operable upon actuation of said resetting means to establish communication between the inlet side of said valve means and said auxiliary passage to said pilot burner while preventing the flow of fuel through said main passage to said main burner.

23. In combination, a main fluid fuel burner, a pilot burner therefor, valve means controlling the flow of fuel to said main burner, a valve housing for said valve means having a main passage leading to said burner and an auxiliary passage leading to said pilot burner, an electromagnet, an armature movable into engagement with said electromagnet, a thermocouple having its hot junction in the pilot flame for energizing said electromagnet sufficiently to hold said armature in engagement therewith but insufficiently to move it into engagement therewith, means associated with said armature for mechanically moving said valve means to a fuel flow preventing position when said armature is released from said electromagnet, resetting means for moving said armature into reengagement with said electromagnet, and means operable upon actuation of said resetting means to establish communication between the inlet side of said valve means and said auxiliary passage to said pilot burner while preventing the flow of fuel through said main passage to said main burner.

24. In combination, a valve, an electromagnet, an armature movable into and out of engagement with said electromagnet, said electromagnet being capable of holding but incapable of moving said armature into engagement therewith, a single biasing means acting to move said armature away from said electromagnet and said valve to a predetermined position, a reset member operable when moved from a normal position to a reset position to move said armature into engagement with said electromagnet, and means operated by said resetting member for maintaining said valve in said predetermined position while said reset member is in said reset position.

25. In combination, a valve, a control device for controlling the position of said valve, an electromagnet, an armature movable into and out of engagement with said electromagnet, said electromagnet being capable of holding but incapable of moving said armature into engagement therewith, a single biasing means biasing said armature away from said electromagnet and said control device to a position in which the valve moves to a predetermined position, and a reset member operable when moved from a normal position to a reset position to move said armature into engagement with said electromagnet, and means operated by said resetting member for maintaining said valve in said predetermined position while said reset member is in said reset position, said means being immediately effective upon movement of said reset member back to its normal position to permit said control device to assume a position in which said valve may move away from said predetermined position.

26. In combination a control device having a safe position and an active position, an electromagnet unit, a cooperating armature unit, one of said units being fixed and the other unit being movable into and out of engagement with said fixed unit and mechanical connecting means between said control device and movable unit for transmitting the movement of said movable unit away from said fixed unit to said control device to move said control device to its safe position, said connecting means being operable to permit application of manual force for moving said movable unit back into engagement with said fixed unit without returning said control device to its active position while thereafter causing such return of said control device upon removal of said manual force and retention of said movable unit by said fixed unit.

27. In combination, a control device having a safe position and an active position, an electromagnet unit, an armature unit, one of said units being fixed and the other of said units being movable into and out of engagement with said fixed unit, a mechanical connection between said movable unit and said control device for moving said control device to its safe position upon movement of said movable unit away from said fixed unit, means for applying a force to said connection in such manner that the movable unit is moved into engagement with said fixed unit and the reaction of such force positively holds said control device in its safe position, and means to return said control device to its active position upon removal of said force if said movable unit is retained by said fixed unit.

FREDERICK D. JOESTING.